(12) United States Patent
Lin et al.

(10) Patent No.: US 11,700,062 B2
(45) Date of Patent: Jul. 11, 2023

(54) OPTICAL TRANSCEIVER

(71) Applicant: Lightel Technologies, Inc., Renton, WA (US)

(72) Inventors: Shyh-Chung Lin, Renton, WA (US); Hongyu Hu, Renton, WA (US)

(73) Assignee: Lightel Technologies, Inc., Renton, WA (US)

( * ) Notice: Subject to any disclaimer, the term of this patent is extended or adjusted under 35 U.S.C. 154(b) by 72 days.

(21) Appl. No.: 17/548,570

(22) Filed: Dec. 12, 2021

(65) Prior Publication Data

US 2023/0188215 A1    Jun. 15, 2023

(51) Int. Cl.
| | |
|---|---|
| *H04B 10/00* | (2013.01) |
| *H04B 10/40* | (2013.01) |
| *G02B 6/42* | (2006.01) |
| *H04J 14/06* | (2006.01) |

(52) U.S. Cl.
CPC .......... *H04B 10/40* (2013.01); *G02B 6/4213* (2013.01); *G02B 6/4246* (2013.01); *H04J 14/06* (2013.01)

(58) Field of Classification Search
CPC .... H04B 10/40; G02B 6/4213; G02B 6/4246; G02B 6/2706; G02B 6/2746; G02B 6/2766; H04J 14/06
See application file for complete search history.

(56) References Cited

U.S. PATENT DOCUMENTS

| | | | | |
|---|---|---|---|---|
| 6,441,961 B1 * | 8/2002 | Hou | ...................... | G02B 27/283 |
| | | | | 359/489.08 |
| 2015/0192804 A1 * | 7/2015 | Lin | ........................ | G02F 1/095 |
| | | | | 359/282 |
| 2017/0242206 A1 * | 8/2017 | Chen | ........................ | G02B 6/00 |
| 2018/0284350 A1 * | 10/2018 | Ayliffe | ................. | G02B 6/4213 |

* cited by examiner

*Primary Examiner* — Pranesh K Barua
(74) *Attorney, Agent, or Firm* — Han IP PLLC; Andy M. Han

(57) ABSTRACT

A simple, compact and low-cost passive optical transceiver device with four terminals may be used in an optical transmission system with polarization-diversity coherent detection scheme. The transceiver is composed of a first polarization splitter/combiner, a non-reciprocal polarization rotator and a second polarization splitter/combiner. The device simultaneously operates as a transmitter and a receiver with optical signals propagating along opposite directions wherein non-reciprocal polarization rotation leads to distinct effects. The received optical signal is thus split into two orthogonal polarization components directed towards two separate ports.

18 Claims, 3 Drawing Sheets

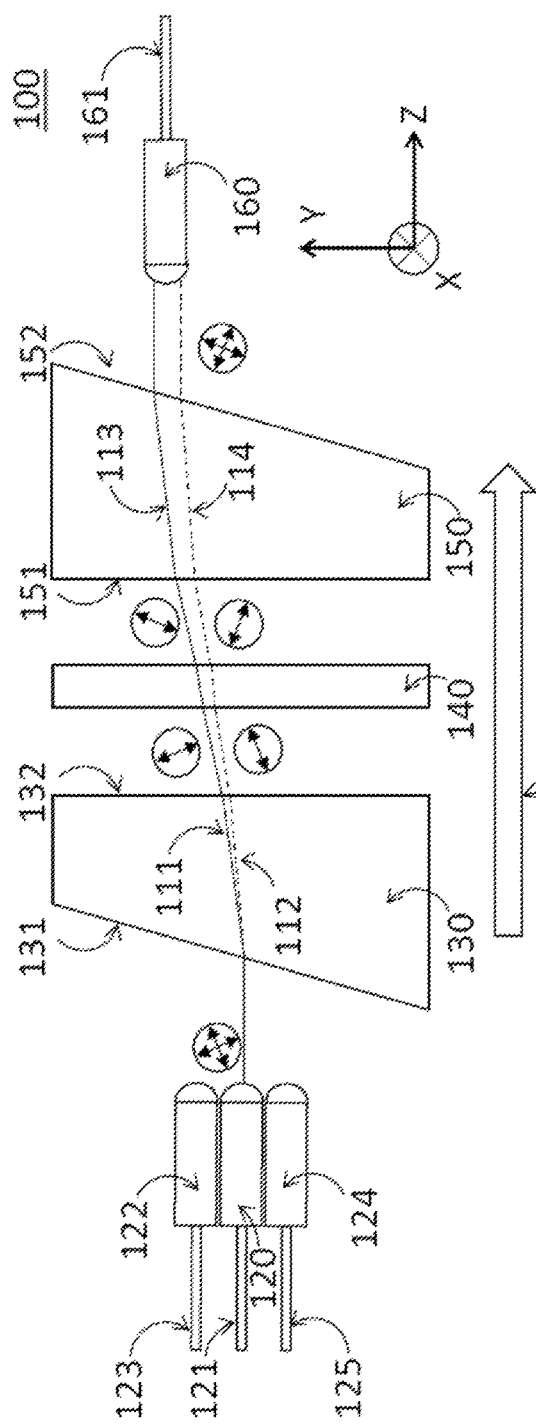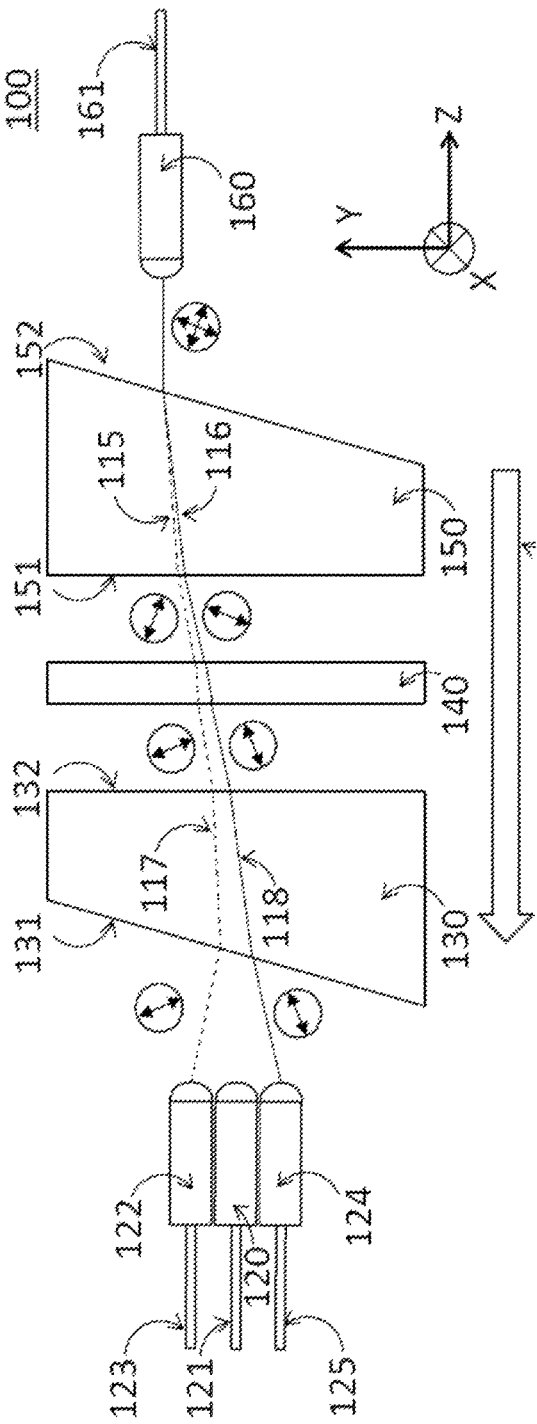

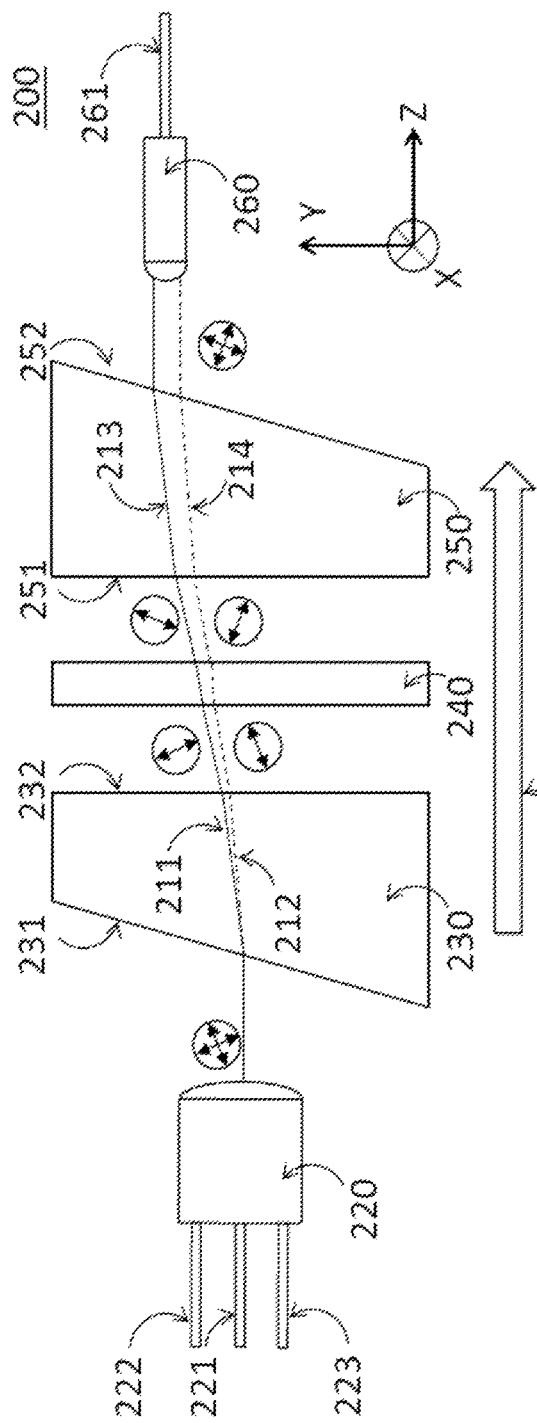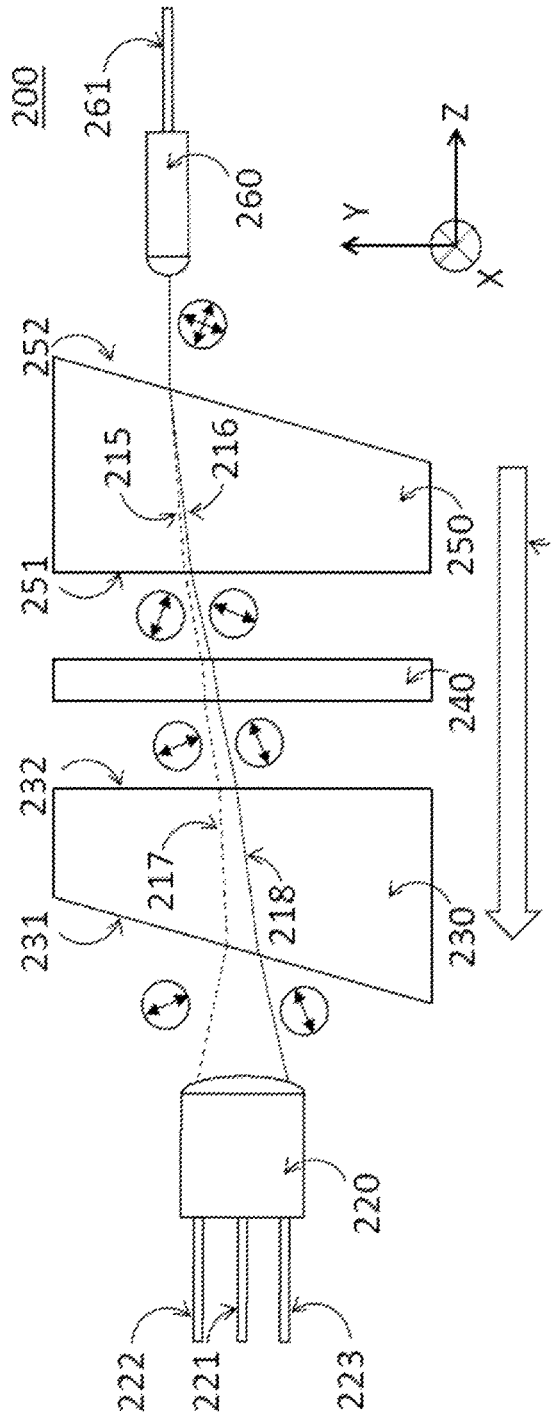

OPTICAL TRANSCEIVER

BACKGROUND

Technical Field

The present invention generally relates to optical signal transmission and detection, and more specifically, to a fiber-optic passive transceiver device suitable for coherent detection with polarization diversity.

Description of Related Art

In an optical transmission system, information is often encoded in the frequency or phase of the optical carrier. For example, a Doppler LiDAR (Light Detection and Ranging) system is able to detect the velocity of a target by measuring the frequency of light. In order to do so, a laser beam is emitted from the transmitter part of the LiDAR towards the target, and a fraction of the beam is backscattered and captured by the LiDAR receiver part. Due to the movement of the target, the returned optical signal suffers from a frequency shift (Doppler frequency shift) which is a function of the target's velocity. Therefore, the instantaneous velocity can be determined if the optical signal is processed appropriately to extract the frequency variation over time.

Optical coherent detection is a technology extensively used to retrieve the frequency shift. In coherent detection, the returned Doppler-frequency-shifted beam is optically mixed with a local oscillator which is essentially a replica of the emitted beam at the original frequency, and then received by a photodetector. The interference of the two beams leads to a beat phenomenon, and as a result, a portion of the combined optical signal seen by the photodetector oscillates at the difference in frequency (the beat frequency), i.e., the Doppler frequency shift. Such frequency is usually low enough which falls within the bandwidth of the detector and can be processed by electronic means.

One of the challenges of coherent detection is polarization mismatch, since interference between the returned optical signal and the local oscillator occurs most efficiently with collinear polarizations, and is by contrast entirely eliminated with perpendicular polarizations. However, the polarization state of the received light wave is usually unpredictable, and furthermore, when conventional single mode fiber is utilized for optical transmission, the polarization state cannot be maintained and is varying in time. Consequently, the receiver often suffers from signal fading and fails to obtain the beat frequency.

In order to overcome polarization sensitivity of the system, a common method known as polarization diversity can be employed, in which the returned beam is partitioned into two orthogonal polarization components and handled separately. Such configuration ensures that the total signal never fades away under all conditions of incoming polarizations. Therefore, it is an objective of the present invention to provide a simple, compact and low-cost passive optical transceiver device which integrates minimal number of components, with the capability of transmitting and receiving light beams simultaneously, as well as splitting the received beam into two orthogonal polarization states and redirecting them into separate paths.

SUMMARY

A passive optical transceiver with a first port as transmitter input, a second port as transmitter output as well as receiver input, a third and a fourth port as polarization-diversity receiver output is constructed by two polarization beam splitters/combiners with wedge profiles and a non-reciprocal polarization rotator sandwiched in between. The first, third and fourth ports are placed at the same side while the second port is placed at the other side. In addition, optical collimators are used to interface with the optical fibers carrying optical signals at the four terminals.

In one aspect, the configuration of the optical elements is arranged such that when light propagates in the forward direction, the two orthogonally polarized optical beams, o-ray and e-ray, emerging from the first polarization beam splitter/combiner remains o-ray and e-ray respectively in the second polarization beam splitter/combiner. When light propagates in the reverse direction, the two orthogonally polarized optical beams, o-ray and e-ray, emerging from the second polarization beam splitter/combiner change to e-ray and o-ray respectively in the first polarization beam splitter/combiner due to non-reciprocal polarization rotation.

In the second aspect, in the forward direction, the assembly works as a transmitter since the two orthogonally polarized optical beams, o-ray and e-ray, are eventually recombined with acceptable amount of lateral offset and walk-off to be jointly coupled into the second port.

In the third aspect, in the backward direction, the assembly works as polarization diversity receiver since the two orthogonally polarized optical beams, o-ray and e-ray, are eventually deviated spatially to be coupled separately into the third port and the fourth port.

In one embodiment, the fiber-optic transceiver device may include individual optical collimator lenses at each of the four optical fiber ports aiming to convert divergent light beams into collimated light beams, or vice versa.

In the other embodiment, the first, third and fourth optical fiber ports share the same optical collimator lens to potentially make the assembly more compact and reduce cost.

Various embodiments are disclosed below, with reference to the attached figures to provide better understanding of the principles and benefits of present invention.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

FIG. 1A and FIG. 1B are diagrams showing side view of forward and backward beam propagation through a passive optical transceiver assembly in accordance with one embodiment of the present disclosure.

FIG. 2A and FIG. 2B are diagrams showing side view of forward and backward beam propagation through a passive optical transceiver assembly in accordance with the other embodiment of the present disclosure.

DETAILED DESCRIPTION OF PREFERRED EMBODIMENTS

Overview

Figure 3B:
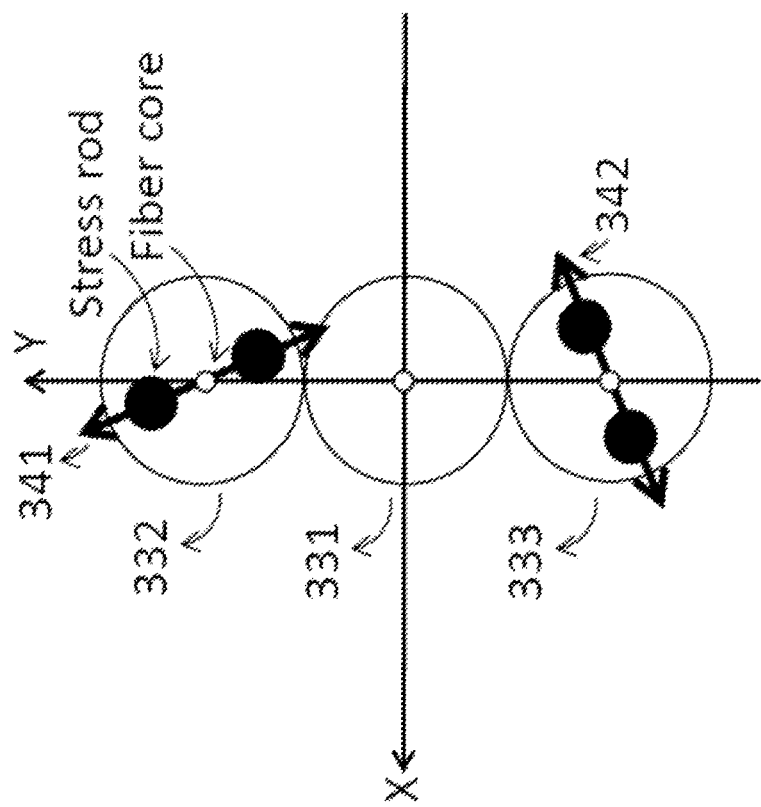
FIG. 3A and FIG. 3B are diagrams showing alignment of polarization maintaining fibers based on the polarization direction of the incident e-ray and o-ray.

Various implementations of the present disclosure and related inventive concepts are described below. It should be acknowledged, however, that the present disclosure is not limited to any particular manner of implementation, and that the various embodiments discussed explicitly herein are primarily for purposes of illustration.

Various proposed designs, schemes and embodiments in accordance with the present disclosure of a passive optical transceiver, which has dedicated ports for optical signal transmission and reception with polarization diversity, are described in detail below. This is realized by the deployment of a design with birefringence and non-reciprocal polarization rotation for polarization splitting, combining and transferring.

The following provides a description of the working principle of the designed passive optical transceiver device, which has a total of four ports: a first port for launching input optical signals; a second port for simultaneously emitting and receiving optical signals (e.g., through an optical antenna); a third and a fourth port for separately guiding each of the two polarization components of the received optical signals. Initially, an input optical signal is collimated by an optical collimator at the first port, which propagates towards a first birefringent polarization beam splitter/combiner where the collimated light beam is split into an o-ray and an e-ray with orthogonal polarizations. Both rays then have their polarizations rotated as they pass through a non-reciprocal polarization rotator, and are recombined by a second birefringent polarization beam splitter/combiner while remaining the same orientation as o-ray and e-ray respectively. Despite the splitting and combining processes, the information carried by the beam remains unaltered and is coupled into the second port for further emission.

In the meantime, a returned optical signal is received and collimated by the second port, which is then divided into an o-ray and an e-ray in the second birefringent polarization beam splitter/combiner. After traveling through the non-reciprocal polarization rotator, the o-ray becomes e-ray and the e-ray becomes o-ray in the first birefringent polarization beam splitter/combiner. Consequently, the two rays with polarizations orthogonal to each other both deviate from the first port (input port) and are instead coupled into the third port and the fourth port respectively to establish polarization diversity scheme.

One embodiment of the optical transceiver is depicted in a side view in FIG. 1A and FIG. 1B. The fiber-optic transceiver assembly 100 comprises a first optical collimator 120 having a first fiber port 121, a second optical collimator 160 having a second fiber port 161, a third optical collimator 122 having a third fiber port 123, a fourth optical collimator 124 having a fourth fiber port 125, a first polarization beam splitter/combiner 130, a non-reciprocal polarization rotator 140, and a second polarization beam splitter/combiner 150.

The first optical collimator 120 comprises a lens to collimate a divergent light beam emerging from the first optical fiber 121. The second optical collimator 160 has similar structure as the first optical collimator 120 to focus a collimated beam into the second optical fiber 161. The third optical collimator 122 comprises a lens for coupling a tilted collimated light beam, making an angle to a longitudinal optical axis (Z-axis) of the assembly, into the third optical fiber 123. The fourth optical collimator 124 has similar structure as the third optical collimator 122 for coupling another tilted collimated light beam into the fourth optical fiber 125. The first optical collimator 120, the third optical collimator 122 and the fourth optical collimator 124 are arranged inline on Y-Z plane at the same side of the assembly 100, while the second optical collimator 160 is located alone at the other side. In general, conventional single mode fibers (SMFs) are used for the first fiber 121 and the second fiber 161, while the third fiber 123 and the fourth fiber 125 are polarization maintaining fibers (PMFs) wherein linear polarizations are preserved during propagation if launched properly as described in detail below. The fibers 121, 161, 123 and 125 are usually secured inside ferrules, and examples of lenses include convex lens and gradient-index lens.

Figure 3A:
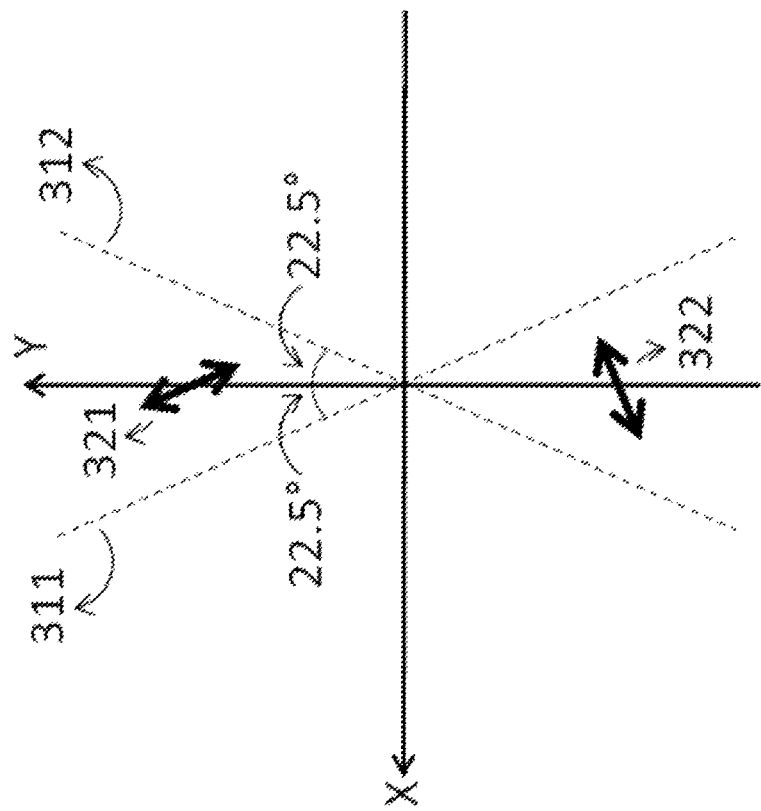

The first polarization beam splitter/combiner 130 comprises a birefringent material cut into a wedge prism profile, with a tilted input surface 131 and a tilted output surface 132. Examples of birefringent materials include, but are not limited to, calcite, rutile, YVO4, and lithium niobate. The second polarization beam splitter/combiner 150 having a tilted input surface 151 and a tilted output surface 152 is of identical design to the first polarization beam splitter/combiner 130. The wedge angle of surface 151 is the same as that of surface 132 and the wedge angle of surface 152 is the same as that of surface 131. The optic axis of the first polarization beam splitter/combiner 130 and the second polarization beam splitter/combiner 150 lie on a plane (X-Y plane) transverse to a longitudinal optical axis (Z-axis) of the transceiver assembly 100. However, referring to FIG. 1A and FIG. 1B, wedge 130 and wedge 150 are configured opposing to each other, leading to opposite optic axis orientation. This is illustrated in FIG. 3A, in which the dotted line 311 shows an optic axis of birefringent wedge 130, and the dotted line 312 shows an optic axis of birefringent wedge 150. Both 311 and 312 make an angle of 22.5 degrees with respect to the vertical Y-axis, but on opposite sides. Therefore, the optic axis of the second birefringent polarization beam splitter/combiner 150 is rotated 45 degrees from the optic axis of the first polarization beam splitter/combiner 130 in the same direction of polarization rotation afforded by the non-reciprocal polarization rotator 140 described below.

Non-reciprocal polarization rotator 140 comprises a magneto-optic rotator crystal or a magneto-optic rotator glass having a permanent internal magnetic field, or alternatively in an external magnet (not shown in the figure). The magnetic field has a component along the direction of light propagation or the opposite direction. The rotator 140 rotates the polarization of incident light beam by 45 degrees. The non-reciprocal polarization rotator 140 may be any Faraday rotator crystal or Faraday rotator glass.

Referring to FIG. 1A, an input optical signal is launched into the first fiber port 121 and propagates along the forward direction 101 (along positive Z-axis). The input optical signal is collimated into a light beam via the first optical collimator 120. The collimated beam is then split into two orthogonally polarized beams, i.e., an e-ray 111 and an o-ray 112, by the first polarization beam splitter/combiner 130, whose polarizations are each rotated by 45 degrees through the non-reciprocal polarization rotator 140. The two beams are recombined by the second polarization beam splitter/combiner 150 since its optic axis is also 45 degrees with respect to that of the first polarization beam splitter/combiner 130, with the e-ray 111 remains e-ray 113 and the o-ray 112 remains o-ray 114. The combined optical signal is coupled into the second fiber port 161 by the second optical collimator 160. FIG. 1A also shows the change of polarization direction viewed longitudinally from the first port 121 towards the second port 161, as arrows inside circles.

It should be noted that in the design described above, when the e-ray 113 and o-ray 114 are recombined, they do not necessarily overlap spatially with each other. In practice, each ray has a lateral offset to the initial ray out of the first optical collimator 120, and moreover, the e-ray 113 walks off from the o-ray 114 due to birefringence which causes non-zero polarization dependent loss (PDL) and polarization mode dispersion (PMD). As long as the e-ray 113 and o-ray 114 are sufficiently parallel when arriving at the second optical collimator 160 and the walk-off is sufficiently small, they can be jointly coupled into the second fiber port 161 with little loss. This can be achieved by, for example, carefully choosing the wedge angles of the tilted surfaces 131, 132, 151 and 152, as well as the dimensions of the first polarization beam splitter/combiner 130 and the second polarization beam splitter/combiner 150. Therefore, in the forward propagation direction 101 the assembly 100 functions as an optical transmitter wherein port 121 acts as the input and port 161 acts as the output.

Referring to FIG. 1B, in the reverse direction 102 (along negative Z-axis), an optical signal received from the second fiber port 161 is collimated by the second optical collimator 160 and split into two polarized beams, o-ray 115 and e-ray 116, via the second polarization beam splitter/combiner 150. After passing through the rotator 140 and arriving at the first polarization beam splitter/combiner 130, because the rotation is non-reciprocal with the rotation in the forward direction 101, the rotated o-ray 115 becomes e-ray 117 and the rotated e-ray 116 becomes o-ray 118 in the first polarization beam splitter/combiner 130. As a consequence, unlike the propagation along forward direction 101, the beams finally emerging from the surface 131 are each angularly deviated from the first optical collimator 120 and cannot be coupled into the first fiber port 121. Instead, the e-ray 117 is coupled into the third fiber port 123 by the third optical collimator 122, and the o-ray 118 is coupled into the fourth fiber port 125 by the fourth optical collimator 124. The change of polarization direction viewed longitudinally from the first port 121 towards the second port 161 is shown in FIG. 1B as arrows inside circles. In summary, the backward propagation of received optical signals makes the assembly 100 function as a polarization diversity receiver wherein port 161 acts as the input, and both port 123 and port 125 acts as the output.

While the e-ray 117 and o-ray 118 are coupled into the corresponding PMFs 123 and 125, it's important that the polarization direction is aligned in the correct way. For example, PANDA PMFs operate by inducing two stress rods on opposite sides of the fiber core to create two orthogonal birefringent axes, called slow axis and fast axis, and only when the incident light is linearly polarized in direction of either axis can the polarization state be maintained in the fiber. FIG. 3A and FIG. 3B illustrate the principle of polarization alignment. In the reverse direction, the polarization of e-ray 117, depicted as 321, is determined by the optic axis of the last polarization beam splitter/combiner it leaves from, and consequently, it is parallel to optic axis 311 when projected onto X-Y plane. On the other hand, the polarization 322 of o-ray 118 is perpendicular to optic axis 311 on X-Y plane. FIG. 3B shows the corresponding fiber arrangement, in which 331, 332 and 333 are the fibers at the first port 121, third port 123 and fourth port 125 respectively. The slow axis of the PM fiber 332 is drawn as 341 while the slow axis of PM fiber 333 is 342. As can be seen in the figure, when projected on X-Y plane, slow axis 341 and 342 need to be aligned in line with the incoming polarization 321 and 322. In an alternate embodiment, fast axes of the PM fiber 332 and 333 can be used instead for polarization alignment.

FIG. 2A and FIG. 2B represent a side view of a fiber-optic optical transceiver assembly 200 according to a second embodiment of the invention. The embodiment differs from the first embodiment in that some of the fiber ports share the same optical collimator, aiming to enhance compactness and cost reduction. The assembly 200 comprises a first optical collimator 220 having a first fiber port 221, a first polarization beam splitter/combiner 230, a non-reciprocal polarization rotator 240, a second polarization beam splitter/combiner 250, and a second optical collimator 260 having a second fiber port 261. In addition, a third fiber port 222 and a fourth fiber port 223 are also enclosed within the first optical collimator 220.

The first optical collimator 220 comprises a lens to collimate a divergent light beam emerging from the first optical fiber 221, and in the meantime couple two other collimated light beams, which make different angles to a longitudinal optical axis (Z-axis) of the assembly, into the third optical fiber 222 and the fourth optical fiber 223 respectively. The second optical collimator 260 has another lens to focus a collimated beam into the second optical fiber 261. The first optical fiber 221, the third optical fiber 222 and the fourth optical fiber 223 are arranged inline on Y-Z plane at the same side of the assembly 200, while the second optical fiber 261 is located alone at the other side. In general, conventional single mode fibers (SMFs) are used for the first fiber 221 and the second fiber 261, while the third fiber 222 and the fourth fiber 223 are polarization maintaining fibers (PMFs) wherein linear polarizations are preserved during propagation if launched properly as described in detail below. The first fiber 221, third fiber 222 and fourth fiber 223 are generally secured inside a single ferrule (generally with ferrule bores to place fibers) or a planar fiber array (generally with V-grooves on a substrate to position fibers), while the second fiber 261 is enclosed in another ferrule. Examples of lenses include convex lens and gradient-index lens.

The first polarization beam splitter/combiner 230 comprises a birefringent material cut into a wedge prism profile, with a tilted input surface 231 and a tilted output surface 232. Examples of birefringent materials include, but are not limited to, calcite, rutile, YVO4, and lithium niobate. The second polarization beam splitter/combiner 250 having a tilted input surface 251 and a tilted output surface 252 is of identical design to the first polarization beam splitter/combiner 230. The wedge angle of surface 251 is the same as that of surface 232 and the wedge angle of surface 252 is the same as that of surface 231. The optic axis of the first polarization beam splitter/combiner 230 and the second polarization beam splitter/combiner 250 lie on a plane (X-Y plane) transverse to a longitudinal optical axis (Z-axis) of the transceiver assembly 200. However, referring to FIG. 2A and FIG. 2B, wedge 230 and wedge 250 are configured opposing to each other, leading to opposite optic axis orientation. This is illustrated in FIG. 3A, in which the dotted line 311 shows an optic axis of birefringent wedge 230, and the dotted line 312 shows an optic axis of birefringent wedge 250. Both 311 and 312 make an angle of 22.5 degrees with respect to the vertical Y-axis, but on opposite sides. Therefore, the optic axis of the second birefringent polarization beam splitter/combiner 250 is rotated 45 degrees from the optic axis of the first polarization beam splitter/combiner 230 in the same direction of polarization rotation afforded by the non-reciprocal polarization rotator 240 described below.

Non-reciprocal polarization rotator 240 comprises a magneto-optic rotator crystal or a magneto-optic rotator glass having a permanent internal magnetic field, or alternatively in an external magnet (not shown in the figure). The magnetic field has a component along the direction of light propagation or the opposite direction. The rotator 240 rotates the polarization of incident light beam by 45 degrees. The non-reciprocal polarization rotator 240 may be any Faraday rotator crystal or Faraday rotator glass.

Referring to FIG. 2A, an input optical signal is launched into the first fiber port 221 and propagates along the forward direction 201 (along positive Z-axis). The input optical signal is collimated into a light beam via the first optical collimator 220. The collimated beam is then split into two orthogonally polarized beams, i.e., an e-ray 211 and an o-ray 212, by the first polarization beam splitter/combiner 230, whose polarizations are each rotated by 45 degrees through the non-reciprocal polarization rotator 240. The two beams are recombined by the second polarization beam splitter/combiner 250 since its optic axis is also 45 degrees with respect to that of the first polarization beam splitter/combiner 230, with the e-ray 211 remains e-ray 213 and the o-ray 212 remains o-ray 214. The combined optical signal is coupled into the second fiber port 261 by the second optical collimator 260. FIG. 2A also shows the change of polarization direction viewed longitudinally from the first port 221 towards the second port 261, as arrows inside circles.

It should be noted that in the design described above, when the e-ray 213 and o-ray 214 are recombined, they do not necessarily overlap spatially with each other. In practice, each ray has a lateral offset to the initial ray out of the first optical collimator 220, and moreover, the e-ray 213 walks off from the o-ray 214 due to birefringence which causes non-zero polarization dependent loss (PDL) and polarization mode dispersion (PMD). As long as the e-ray 213 and o-ray 214 are sufficiently parallel when arriving at the second optical collimator 260 and the walk-off is sufficiently small, they can be jointly coupled into the second fiber port 261 with little loss. This can be achieved by, for example, carefully choosing the wedge angles of the tilted surfaces 231, 232, 251 and 252, as well as the dimensions of the first polarization beam splitter/combiner 230 and the second polarization beam splitter/combiner 250. Therefore, in the forward propagation direction 201 the assembly 200 functions as an optical transmitter wherein port 221 acts as the input and port 261 acts as the output.

Referring to FIG. 2B, in the reverse direction 202 (along negative Z-axis), an optical signal received from the second fiber port 261 is collimated by the second optical collimator 260 and split into two polarized beams, o-ray 215 and e-ray 216, via the second polarization beam splitter/combiner 250. After passing through the rotator 240 and arriving at the first polarization beam splitter/combiner 230, because the rotation is non- reciprocal with the rotation in the forward direction 201, the rotated o-ray 215 becomes e- ray 217 and the rotated e-ray 216 becomes o-ray 218 in the first polarization beam splitter/combiner 230. As a consequence, unlike the propagation along forward direction 201, the beams finally emerging from the surface 231 are each angularly deviated and cannot be coupled into the first fiber port 221. Instead, the e-ray 217 is coupled into the third fiber port 222 by the first optical collimator 220, and the o-ray 218 is coupled into the fourth fiber port 223 by the same optical collimator 220. The change of polarization direction viewed longitudinally from the first port 221 towards the second port 261 is shown in FIG. 2B as arrows inside circles. In summary, the backward propagation of received optical signals makes the assembly 200 function as a polarization diversity receiver wherein port 261 acts as the input, and both port 222 and port 223 acts as the output.

While the e-ray 217 and o-ray 218 are coupled into the corresponding PMFs 222 and 223, it's important that the polarization direction is aligned in the correct way. For example, PANDA PMFs operate by inducing two stress rods on opposite sides of the fiber core to create two orthogonal birefringent axes, called slow axis and fast axis, and only when the incident light is linearly polarized in direction of either axis can the polarization state be maintained in the fiber. FIG. 3A and FIG. 3B illustrate the principle of polarization alignment. In the reverse direction, the polarization of e-ray 217, depicted as 321, is determined by the optic axis of the last polarization beam splitter/combiner it leaves from, and consequently, it is parallel to optic axis 311 when projected onto X-Y plane. On the other hand, the polarization 322 of o-ray 218 is perpendicular to optic axis 311 on X-Y plane. FIG. 3B shows the corresponding fiber arrangement, in which 331, 332 and 333 are the fibers at the first port 221, third port 222 and fourth port 223 respectively. The slow axis of the PM fiber 332 is drawn as 341 while the slow axis of PM fiber 333 is 342. As can be seen in the figure, when projected on X-Y plane, slow axis 341 and 342 need to be aligned in line with the incoming polarization 321 and 322. In an alternate embodiment, fast axes of the PM fiber 332 and 333 can be used instead for polarization alignment.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A passive optical transceiver assembly, comprising: a first optical collimator; a first polarization beam splitter/combiner; a non-reciprocal polarization rotator; a second polarization beam splitter/combiner; a second optical collimator; a third optical collimator; and a fourth optical collimator, wherein, in a forward direction, with an input optical signal launched into the first optical collimator, a first collimated optical beam emerges, passes through sequentially the first polarization beam splitter/combiner, the non-reciprocal polarization rotator and the second polarization beam splitter/combiner, and exits through the second optical collimator, wherein, with the first collimated optical beam propagating in the forward direction, polarizations of two orthogonally polarized beams, a first o-ray and a first e-ray, emerging from the first polarization beam splitter/combiner, are configured so that the first o-ray from the first polarization beam splitter/combiner remains the first o-ray in the second polarization beam splitter/combiner and the first e-ray from the first polarization beam splitter/combiner remains the first e-ray in the second polarization beam splitter/combiner, wherein, with the first optical signal propagating in the forward direction, the two orthogonally polarized beams, the first o-ray and the first e-ray, divided by the first polarization beam splitter/combiner, are recombined by the second polarization beam splitter/combiner, wherein, in a reverse direction, with a second optical signal received in the second optical collimator, a second collimated optical beam passes through sequentially the second polarization beam splitter/combiner, the non-reciprocal polarization rotator and the first polarization beam splitter/combiner, and emerges as two angularly deviated beams due to non-reciprocal polarization rotation, wherein, with the second collimated optical beam propagating in the reverse direction and with a second o-ray and a second e-ray emerging from the second polarization beam splitter/combiner, the second o-ray from the second polarization beam splitter/combiner becomes the second e-ray in the first polarization beam splitter/combiner and the second e-ray from the second polarization beam splitter/combiner becomes the second o-ray in the first polarization beam splitter/combiner, wherein, with the second optical signal propagating in the reverse direction, the two orthogonally polarized beams, the second o-ray and the second e-ray, are each received respectively by the third optical collimator and the fourth optical collimator into a respective polarization maintaining fiber, wherein the assembly performs as an optical transmitter in the forward direction with the first optical collimator as an input thereof and the second optical collimator as an output thereof, and wherein the assembly performs as an optical receiver in the reverse direction with the second optical collimator as an input thereof and the third/fourth optical collimator as a polarization diversity output thereof.

2. The passive optical transceiver assembly of claim 1, wherein the first optical collimator, the third optical collimator and the fourth optical collimator are arranged inline at one side of the assembly, and wherein the second optical collimator is located at an opposite side of the assembly.

3. The passive optical transceiver assembly of claim 1, wherein each of the first and second optical collimators comprises a single mode fiber pigtail and a collimator lens while each of the third and fourth optical collimators comprises a polarization maintaining fiber pigtail and a collimator lens, with a collimated optical beam emerges from or enters each of the fibers.

4. The passive optical transceiver assembly of claim 1, wherein each of the first optical collimator, the second optical collimator, the third optical collimator and the fourth optical collimator comprises a convex lens.

5. The passive optical transceiver assembly of claim 1, wherein each of the first optical collimator, the second optical collimator, the third optical collimator and the fourth optical collimator comprises a gradient-index lens.

6. The passive optical transceiver assembly of claim 1, wherein each of the first polarization beam splitter/combiner and the second polarization beam splitter/combiner comprises a birefringent crystal wedge.

7. The passive optical transceiver assembly of claim 1, wherein each of the first polarization beam splitter/combiner and the second polarization beam splitter/combiner comprises a birefringent material with an optic axis on a plane transverse to a longitudinal mechanical axis of the assembly.

8. The passive optical transceiver assembly of claim 1, wherein an optic axis of the second polarization beam splitter/combiner is rotated 45 degrees from an optic axis of the first polarization beam splitter/combiner when projected on a plane transverse to a longitudinal mechanical axis of the assembly.

9. The passive optical transceiver assembly of claim 1, wherein the first polarization beam splitter/combiner and the second polarization beam splitter/combiner are of identical design.

10. The passive optical transceiver assembly of claim 7, wherein the birefringent material can include any one of calcite, rutile, YVO4 and lithium niobate crystals.

11. The passive optical transceiver assembly of claim 1, wherein the non-reciprocal polarization rotator rotates a polarization of an incoming light beam by 45 degrees.

12. The passive optical transceiver assembly of claim 1, wherein the non-reciprocal polarization rotator comprises a Faraday rotating crystal.

13. The passive optical transceiver assembly of claim 1, wherein the non-reciprocal polarization rotator comprises a Faraday rotating glass.

14. The passive optical transceiver assembly of claim 1, wherein a slow axis and a fast axis of the polarization maintaining fibers are aligned in line with or perpendicular to an optic axis of the first polarization beam splitter/combiner when projected on a plane transverse to a longitudinal mechanical axis of the assembly.

15. The passive optical transceiver assembly of claim 1, wherein the first optical collimator, the third optical collimator and the fourth optical collimator are integrated into a single collimator, and wherein a first optical fiber, a third optical fiber and a fourth optical fiber share a single collimator lens.

16. The passive optical transceiver assembly of claim 15, wherein a first optical fiber, a third optical fiber and a fourth optical fiber are arranged inline at one side of the assembly, and wherein the second optical collimator is located at an opposite side of the assembly.

17. The passive optical transceiver assembly of claim 15, wherein a first optical fiber, a third optical fiber and a fourth optical fiber are within a same ferrule.

18. The passive optical transceiver assembly of claim 15, wherein a first optical fiber, a third optical fiber and a fourth optical fiber are within a same planar fiber array.

\* \* \* \* \*